US011373263B2

(12) United States Patent
Cho et al.

(10) Patent No.: US 11,373,263 B2
(45) Date of Patent: Jun. 28, 2022

(54) IMAGE PROCESSING DEVICE CAPABLE OF ASSISTING WITH SETTING OF WORK RESTORATION, METHOD OF CONTROLLING THE SAME, AND RECORDING MEDIUM

(71) Applicant: CANON KABUSHIKI KAISHA, Tokyo (JP)

(72) Inventors: Genki Cho, Kawasaki (JP); Yuuya Miyake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 272 days.

(21) Appl. No.: 16/684,954

(22) Filed: Nov. 15, 2019

(65) Prior Publication Data
US 2020/0167886 A1    May 28, 2020

(30) Foreign Application Priority Data
Nov. 26, 2018    (JP) .............................. JP2018-220364

(51) Int. Cl.
G06K 9/00    (2022.01)
G06T 1/00    (2006.01)
B25J 9/16    (2006.01)

(52) U.S. Cl.
CPC ........... *G06T 1/0014* (2013.01); *B25J 9/1697* (2013.01)

(58) Field of Classification Search
CPC ... G06T 7/73; G06T 2207/30164; G06T 7/70; G06T 7/33; G06T 2207/30204; G06K 9/00744; G06K 2209/3225
See application file for complete search history.

(56) References Cited

U.S. PATENT DOCUMENTS

| 5,572,103 A    * | 11/1996 | Terada .................... B25J 9/1656 |
| | | 318/568.11 |
| 2003/0078694 A1* | 4/2003 | Watanabe .......... G05B 19/4202 |
| | | 700/245 |

(Continued)

FOREIGN PATENT DOCUMENTS

| CN | 102957859 A | 3/2013 |
| CN | 108000499 A | 5/2018 |

(Continued)

OTHER PUBLICATIONS

The above foreign documents were cited in a Jun. 3, 2021 Chinese Office Action, a copy of which is enclosed with an English Translation, that issued in Chinese Patent Application No. 201911173238.3.

*Primary Examiner* — Guillermo M Rivera-Martinez
(74) *Attorney, Agent, or Firm* — Cowan, Liebowitz & Latman, P.C.

(57) ABSTRACT

A work system includes a robot control device, a robot, an image processing device, and an imaging device. The robot control device controls an operation of the robot using a teaching point. The image processing device acquires an image by controlling the imaging device and capturing an image of a workpiece at the teaching point, and stores image data after imaging in association with data of an operation position of the robot corresponding to the teaching point. When a user performs work restoration, the image processing device performs a process of assisting with setting of work restoration by performing control for acquiring an image captured by the imaging device at the operation position of the robot during work restoration and displaying a difference between the image and the stored image.

11 Claims, 8 Drawing Sheets

(56) References Cited

U.S. PATENT DOCUMENTS

| | | | |
|---|---|---|---|
| 2005/0107920 A1* | 5/2005 | Ban | G05B 19/4083 700/245 |
| 2006/0276934 A1* | 12/2006 | Nihei | B25J 9/1679 700/245 |
| 2011/0106304 A1* | 5/2011 | Nihei | G05B 19/4083 700/245 |
| 2011/0288667 A1* | 11/2011 | Noda | G05B 19/42 700/98 |
| 2011/0295421 A1* | 12/2011 | Ban | B25J 9/101 700/245 |
| 2012/0236140 A1* | 9/2012 | Hazeyama | B25J 9/1697 348/94 |
| 2013/0073089 A1* | 3/2013 | Nakahara | B25J 9/1692 700/259 |
| 2015/0262346 A1* | 9/2015 | Horita | H04N 5/23222 348/137 |
| 2016/0059413 A1* | 3/2016 | Ogata | B25J 9/1666 700/186 |
| 2016/0082598 A1* | 3/2016 | Anducas Aregall | B21J 15/142 382/153 |
| 2016/0288318 A1* | 10/2016 | Nakazato | B25J 9/1666 |
| 2016/0343125 A1* | 11/2016 | Keitler | H04N 13/246 |
| 2016/0379357 A1* | 12/2016 | Takazawa | B25J 9/1697 348/86 |
| 2018/0222049 A1* | 8/2018 | Suzuki | B25J 9/161 |
| 2018/0222056 A1* | 8/2018 | Suzuki | B25J 9/1664 |
| 2018/0250823 A1* | 9/2018 | Shimodaira | B25J 9/1697 |
| 2021/0229290 A1* | 7/2021 | Kume | B25J 9/1697 |

FOREIGN PATENT DOCUMENTS

| | | |
|---|---|---|
| CN | 108214486 A | 6/2018 |
| CN | 108604131 A | 9/2018 |
| JP | 07-237158 A | 9/1995 |

* cited by examiner

| MOVEMENT POINT ID | MOVEMENT POINT INFORMATION | CORRESPONDING STORED IMAGE | IMAGING PARAMETER | |
|---|---|---|---|---|
| 1 | $X_1, Y_1, Z_1, Rx_1, Ry_1, Rz_1 \cdots$ | Image20180601_121234.bmp  | Camera ID=1, F=2, Gain=20, SS=1/30, WB=AWB, f=28mm | 501 |
| 2 | $X_2, Y_2, Z_2, Rx_2, Ry_2, Rz_2 \cdots$ | Image20180601_121235.bmp  | Camera ID=1, F=2, Gain=20, SS=1/30, WB=AWB, f=28mm | 502 |
| 3 | $X_3, Y_3, Z_3, Rx_3, Ry_3, Rz_3 \cdots$ | Image20180601_121236.bmp  | Camera ID=1, F=3, Gain=15, SS=1/30, WB=AWB, f=50mm | 503 |
| 4 | $X_4, Y_4, Z_4, Rx_4, Ry_4, Rz_4 \cdots$ | Image20180601_121237.bmp  | Camera ID=2, F=3, Gain=15, SS=1/30, WB=AWB, f=50mm | 504 |
| ⋮ | | | | |

IMAGE PROCESSING DEVICE CAPABLE OF ASSISTING WITH SETTING OF WORK RESTORATION, METHOD OF CONTROLLING THE SAME, AND RECORDING MEDIUM

BACKGROUND OF THE INVENTION

Field of the Invention

The present invention relates to an image processing technique in control of a device for work such as a robot.

Description of the Related Art

In systems that perform the production, quality confirmation, transportation, or the like of a product using an imaging device and a robot device, a picking mechanism of a target (hereinafter referred to as a workpiece), a robot arm, an actuator, a transport mechanism, and the like are controlled. An image of a workpiece is captured by the imaging device and image processing is performed to measure the position of the workpiece or inspect the workpiece, whereby switching of control instructions of the robot device or correction of its operation can be performed, and thus it is possible to construct a system that performs a greater variety of work.

In robot systems using an imaging device or an image processing device, various devices deviate from installation conditions determined in advance due to a touch of a device, a change over time, or the like, whereby shifts of the positions or postures thereof (hereinafter referred to as positional shifts) may be caused. In this case, there is the possibility of a decrease in the reproducibility of work or work becoming impossible. In order to restore work, it is necessary to restore or adjust the position of a work tool such as a robot device, a workbench, or a jig tool constituting a system.

Incidentally, a method of performing adjustment work of a position or posture whenever a positional shift of the robot device or the work tool is generated takes time and effort. Consequently, there is a method of fixing the robot device, various members, or peripheral instruments to a trestle, a stage or the like having high rigidity using an adhesive, welding, a metal fitting, a screw, or the like. However, in such a method of suppressing a positional shift, it takes time and effort to change work content. For example, a system in which a robot or a control instrument working in cooperation with a person is used and work content is changed frequently is assumed. Since there is the possibility of a positional shift being generated frequently due to a worker's contact with a robot, a control instrument, a peripheral work tool, or the like, it is preferable for work of a system to be able to be restored more simply.

Japanese Patent Laid-Open No. 7-237158 discloses a correction method of performing any one of correction of the position and posture of an object to be imaged (such as a workpiece or a background) with reference to the object to be imaged on the basis of the amount of positional shift and correction of design data by as great an amount as the amount of positional shift.

In a system of the related art including a camera and a robot, processing of assisting with restoration of work in a case where a positional shift of a device constituting the system or the like occurs is not sufficient, and it is difficult to reproduce desired work.

SUMMARY OF THE INVENTION

The present invention provides an image processing device that makes it possible to restore work in a short time and reproduce desired work.

An image processing device according to an embodiment of the present invention includes a control unit configured to control an operation of a device for work using a teaching point representing a position or posture of the device for work, a storage unit configured to store image data at the teaching point captured by an imaging unit and data of the position or posture of the device for work corresponding to the teaching point in association with each other, and an image processing unit configured to perform an assistance process of assisting with setting of work restoration by processing data of a first image captured by the imaging unit at the teaching point of the device for work when work restoration is performed and data of a second image at the teaching point which is read out from the storage unit, and displaying the first and second images.

Further features of the present invention will become apparent from the following description of exemplary embodiments with reference to the attached drawings.

DESCRIPTION OF THE EMBODIMENTS

Hereinafter, an embodiment of the present invention will be described in detail with reference to the accompanying drawings. The present embodiment shows an example of a system in which work is performed by control of a robot, but the present invention can also be applied to various systems including a device for work such as a manipulator or a transport device.

Figure 1:
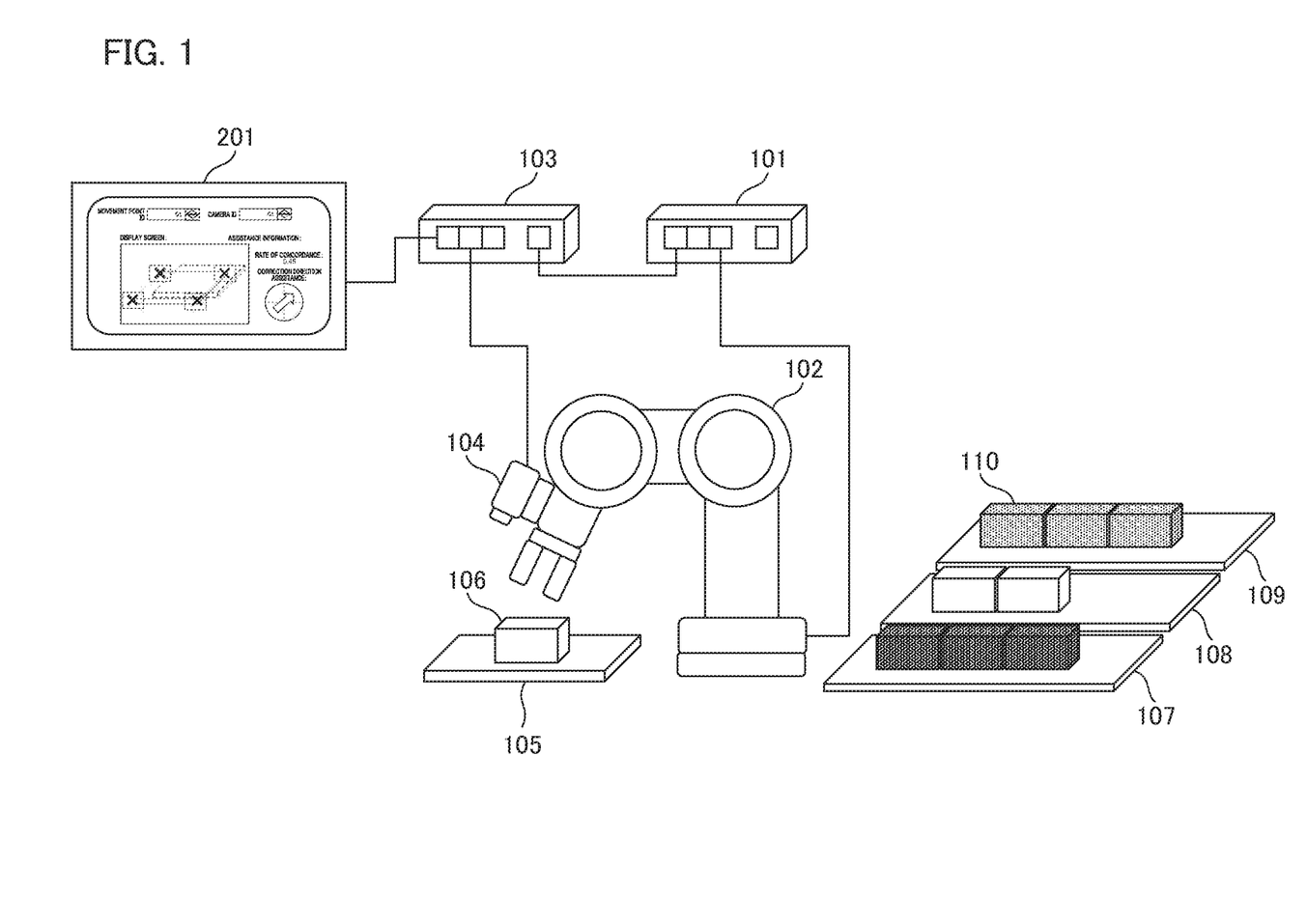
FIG. 1 is an overall configuration diagram of a system including an image processing device according to an embodiment.

FIG. 1 is an overall configuration diagram of a system including an image processing device according to the present embodiment. A robot control device 101 controls each shaft or a hand of a robot 102 in accordance with control instructions from an external device. The robot control device 101 of the present embodiment is assumed to receive control instructions from an image processing device 103, but there is no limitation on a system configuration or an instruction mode which can be used. In addition, the robot control device 101 or the image processing device 103 is housed in the same housing as the robot 102 in some cases, but both will be described as separate devices in the present embodiment.

The image processing device 103 controls an imaging operation performed by an imaging device 104 through setting of predetermined imaging parameters in accordance with optional procedures, and performs processing of a captured image or output of a processing result. The imaging device 104 of the present embodiment is configured to be installed on the robot 102, but they may be installed separately.

The image processing device 103 sends control instructions to the robot control device 101. The robot control device 101 accepts the control instructions, and changes the posture of the robot 102 to a posture at which it is capable of capturing an image of a workpiece 106 on a workbench 105 (hereinafter referred to as an imaging posture) by controlling the robot 102. Once the posture of the robot 102 becomes an imaging posture, the image processing device 103 captures an image of the workpiece 106 that is a subject using the imaging device 104. The image processing device 103 performs image processing using data of the captured image, and identifies the type of the workpiece 106. The image processing device 103 then places the workpiece 106 on one of placement stands 107 to 109 corresponding to the type. In this case, the image processing device 103 further measures the position and posture of the workpiece 106 as necessary, and may correct the picking posture of the robot 102 or inspect whether or not there is a problem in the quality of the workpiece 106. As shown by an example 110 of a workpiece disposed in the present system, the workpiece is classified according to its type and disposed on one of the placement stands 107 to 109.

For example, in an industrial application, if an image processing device and an imaging device are used as visual devices of a robot, a system that controls the robot by performing image processing or the like at any time decreases in production efficiency, and therefore a timing of imaging or composition suitable for image processing is often set in advance.

As shown in FIG. 1, if the imaging device 104 is installed on the robot 102, the robot 102 is changed to have an imaging posture, and then imaging is performed by adjusting imaging parameters of the imaging device 104. A user previously teaches the robot the upper position of the workbench 105 as a teaching point for imaging, and thereafter repeated imaging or image processing is performed using the teaching point. The image processing device 103 stores a teaching point and an imaging parameter corresponding thereto or a method of determining an imaging parameter (use of a fixed value, automatic exposure, automatic focusing, or the like), and the subsequent imaging is performed using the imaging parameter. The teaching point is stored in the robot 102, the robot control device 101, or the image processing device 103. In addition, data indicating imaging parameters of image processing or content of image processing is stored in the image processing device 103. The same is true of a case where the robot 102 picks or lifts the workpiece 106, a case where the robot moves above the placement stands 107 to 109, or a case where a situation in which the placement stand is empty is confirmed. A process of previously teaching the position or posture of the robot 102 or a process of setting content of image processing in advance is executed.

If positional shifts between the robot 102, the workbench 105, the placement stands 107 to 109, and the like are caused and thus relative positional relationships therebetween are not able to be secured, there is a problem in that desired work is not guaranteed. Restoration assistance processes of the system in such cases will be described with reference to FIGS. 2 to 6.

Figure 2:
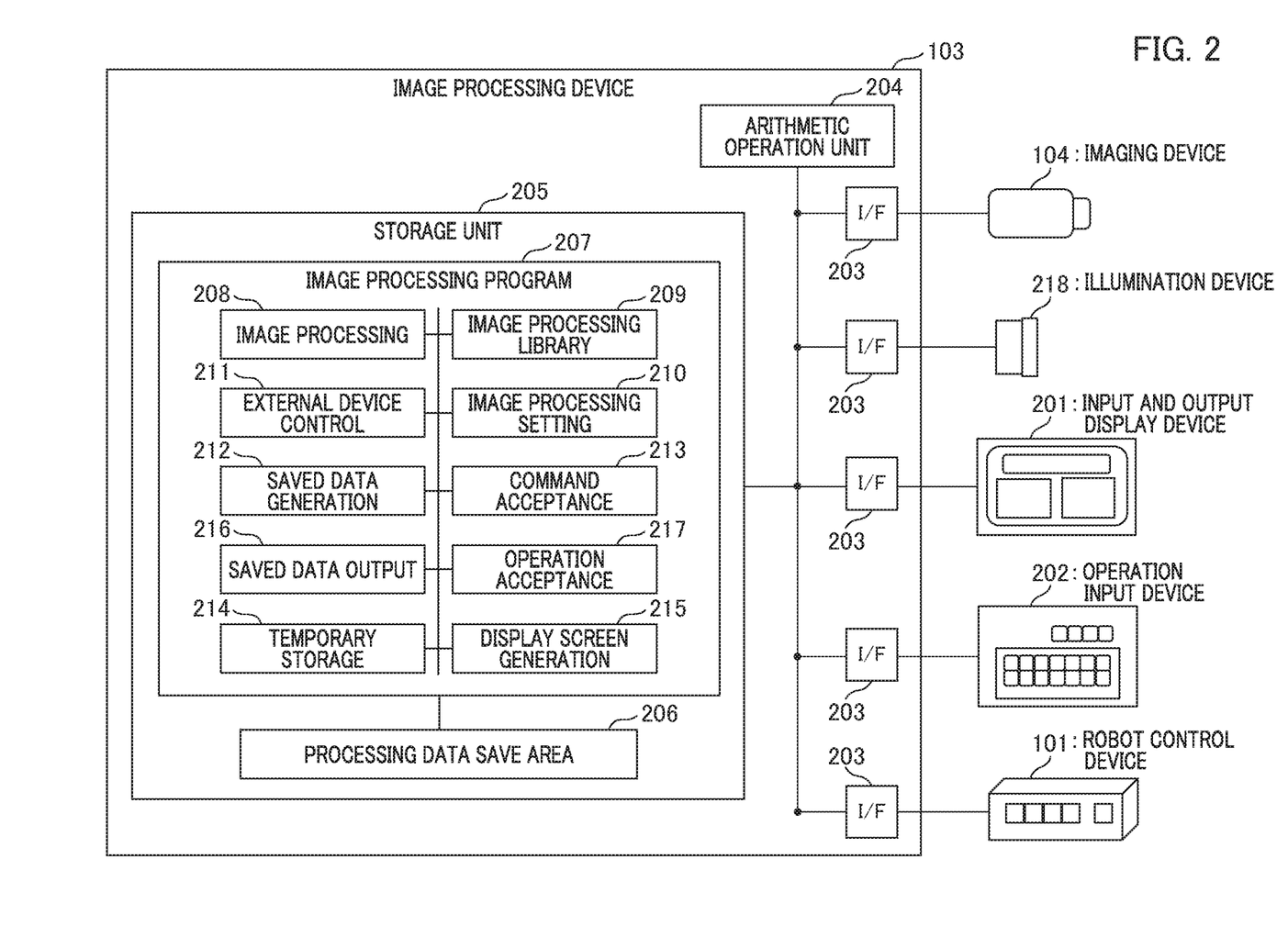
FIG. 2 is a block diagram of the image processing device according to the embodiment.

FIG. 2 is a block diagram based on the image processing device 103. The image processing device 103 is connected to the robot control device 101 and the imaging device 104 through a plurality of interface units 203. An input and output display device 201 and an operation input device 202 are devices for a user interface connected to the image processing device 103 through interface units 203. The respective devices are connected to each other through respective interface units 203 disposed on the internal bus of the image processing device 103. Each of the interface units 203 is constituted by a network interface unit, a serial communication interface unit, or the like according to a connection target on the basis of a standard appropriate for communication. Meanwhile, various types of devices can be provided with any user interface unit in accordance with the purpose of the system, or can be dynamically determined using a processing algorithm, a program, and the like.

The input and output display device 201 includes a display device such as a cathode tube or a liquid crystal panel that displays an image. The operation input device 202 is constituted by a keyboard, a pointing device, a touch panel, an input operation controller, a gesture input device, or the like.

The imaging device 104 connected to the image processing device 103 may be provided with an illumination device 218 as necessary for the purpose of imaging. The illumination device 218 includes a light source such as a halogen lamp or a light-emitting diode, and is connected to the image processing device 103 through an interface unit 203. In addition, an external storage device may be connected to the image processing device 103 to thereby increase a storage capacity.

The image processing device 103 includes an arithmetic operation unit 204 constituted by a central processing unit (CPU) formed as a general-purpose microprocessor appropriate for controlling image processing, an image processing processor, or the like. The arithmetic operation unit 204 is connected to a storage unit 205 through an internal bus (such as a data bus, an address bus, or other control lines).

An example of the storage unit 205 to be used includes a ROM, a RAM, a non-volatile memory device such as an EPROM or an EEPROM, or an external storage device. "ROM" is an abbreviation for "read only memory," and "RAM" is an abbreviation for "random access memory." "EPROM" is an abbreviation for "erasable programmable read only memory." "EEPROM" is an abbreviation for "electrically erasable programmable read only memory." The external storage device is, for example, a storage device constituted by a hard disk drive device (HDD) or a semiconductor memory element, a storage device capable of being connected to an interface unit 203, or the like.

The storage unit 205 includes a processing data save area 206 and a program storage area. The processing data save area 206 is constituted by a RAM area in the storage unit 205, a file area or a virtual storage area of the external storage device, or the like. The processing data save area 206 is used as a storage area of setting parameters or the like of image processing in addition to temporarily storing processing data.

An image processing program 207 for executing image processing of the present embodiment is stored in the program storage area of the storage unit 205. The image processing program 207 is a program for executing a setting change of image processing or predetermined image processing in accordance with various operations performed by the operation input device 202. In addition, regarding content of change, data can be saved in or deleted from the processing data save area 206.

The image processing program 207 is constituted by software modules for realizing various functions. For example, an image processing module 208 is a main body of a program for realizing image processing. An image processing library 209 is used in image processing that is performed by the image processing module 208. The image processing library 209 is mounted in the storage unit 205 as, for example, a library that is linked statically or dynamically. The image processing setting module 210 determines an action of the image processing program 207. An image processing setting is performed in accordance with various operations performed by the operation input device 202.

Further, the image processing program 207 includes input and output (I/O) subroutines for realizing the following function. For example, there are an external device control subroutine 211, a saved data generation subroutine 212, and a command acceptance subroutine 213 for accepting a control command from the robot control device 101. In addition, there are a temporary storage subroutine 214 using a RAM area, a cache area of the arithmetic operation unit 204, or the like and a display screen generation subroutine 215. A saved data output subroutine 216 is a program for reading out and outputting data saved in the processing data save area 206, and an operation acceptance subroutine 217 is a program for accepting operation instructions from the operation input device 202. Each function is mounted in the storage unit 205 in the form of an application (utility) program or a subroutine configured as a library that is linked statically or dynamically.

The CPU of the arithmetic operation unit 204 of the image processing device 103 performs control of the imaging device 104 and image processing by executing the image processing program 207. In addition, a process of accepting a user's operation instruction through the operation acceptance subroutine 217 or a process of accepting a control command from the robot control device 101 through the command acceptance subroutine 213 is executed by the operation input device 202. The arithmetic operation unit 204 performs an arithmetic operation process by calling each function module or a library of the image processing program 207 in accordance with the operation instruction or the control command, and transmits data of an image processing result to the robot control device 101. In addition, the data of an image processing result can be transmitted to an external storage device and accumulated (logged) therein. Further, a screen configuration stored in advance by a program and an image processing result are synthesized on a screen, and a process displayed on the input and output display device 201 is executed.

Figure 3:
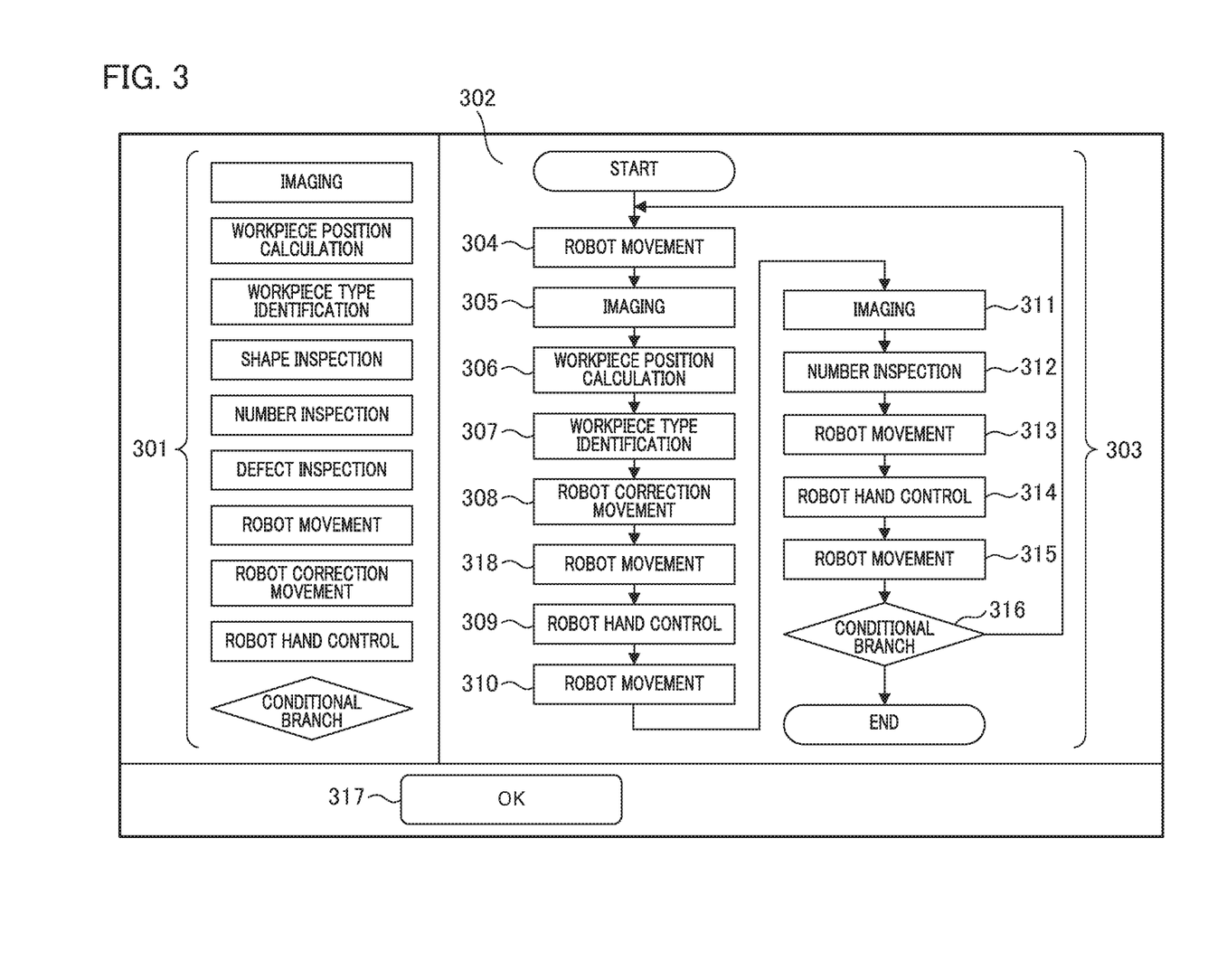
FIG. 3 is a diagram representing a flow chart creation screen according to the embodiment.

FIG. 3 is a diagram illustrating an example of a flow chart creation screen for creating the image processing program 207. This screen is displayed on the input and output display device 201. The image processing program 207 according to the present embodiment is assumed to be executed in accordance with a flow chart created using the image processing device 103 by a user. In another embodiment, a user creates the image processing program 207 using an image processing program creation device that is not shown in FIG. 1. In this case, the created image processing program 207 is transmitted to and stored in the storage unit 205 of the image processing device 103. In addition, in this embodiment, a package function involving a combined image processing flow chart previously prepared in a fixed formed by functions or objects may be used. In this case, a user can select a desired function on a graphical user interface (GUI), and adjust parameters or the like.

A part list 301 is a list of respective processing parts constituting a flow chart. A user can designate various processes shown in a rectangular frame or a conditional branch process shown in a rhombic frame. For example, a user designates desired processing parts from the part list 301 using the operation input device 202. A flow chart can be created by performing a drag & drop operation using a pointing device or the like and linking a plurality of processing parts disposed in a flow chart region 302 through lines.

A flow chart 303 constituted by a plurality of processing parts is an example in which a process of extracting the workpiece 106 from the workbench 105 using the robot 102 and placing the workpiece on one of the placement stands 107 to 109 in accordance with the type of the workpiece is described. After the start of the process, posture control for moving the robot 102 above the workbench 105 is performed in robot movement 304, and the robot 102 assumes an imaging posture. Imaging 305 is a process of capturing an image of the workpiece 106. Subsequent workpiece position calculation 306 is a calculation process of calculating the position or phase of the workpiece 106, and subsequent workpiece type identification 307 is a process of identifying the type of the workpiece 106 using a colored pattern or the like. Robot correction movement 308 is a process of performing correction control of the robot 102 in accordance with the position and phase of the workpiece 106 calculated in the workpiece position calculation 306, and moving or rotating the hand (end effector) of the robot 102 above the position of the workpiece.

Subsequent robot movement 318 is a process of moving the robot 102 to a position at which the workpiece 106 can be picked using the hand of the robot 102, for example, a position directly above the workpiece 106. Robot hand control 309 is a process of controlling opening and closing of the hand and picking the workpiece 106. Subsequent robot movement 310 is a process of performing robot movement above a placement stand according to the type of the workpiece 106, and a process of capturing an image of a placement stand is executed in imaging 311. A process of inspecting the number of workpieces using a captured image of the imaging device 104 is performed in number inspection 312. Subsequent robot movement 313 is a process of performing robot movement to a placement position corresponding to the number. In robot hand control 314, a process of controlling opening and closing of the hand and placing the workpiece 106 is executed. Subsequent robot movement 315 is a process of performing robot movement above a placement stand. Conditional branch 316 is a determination process of comparing the number of tasks of the robot 102 with a predetermined value (threshold), and returning to the robot movement 304 if the number of tasks is less than a predetermined value. If the number of tasks reaches the predetermined value, the series of processes is ended.

Figure 4:
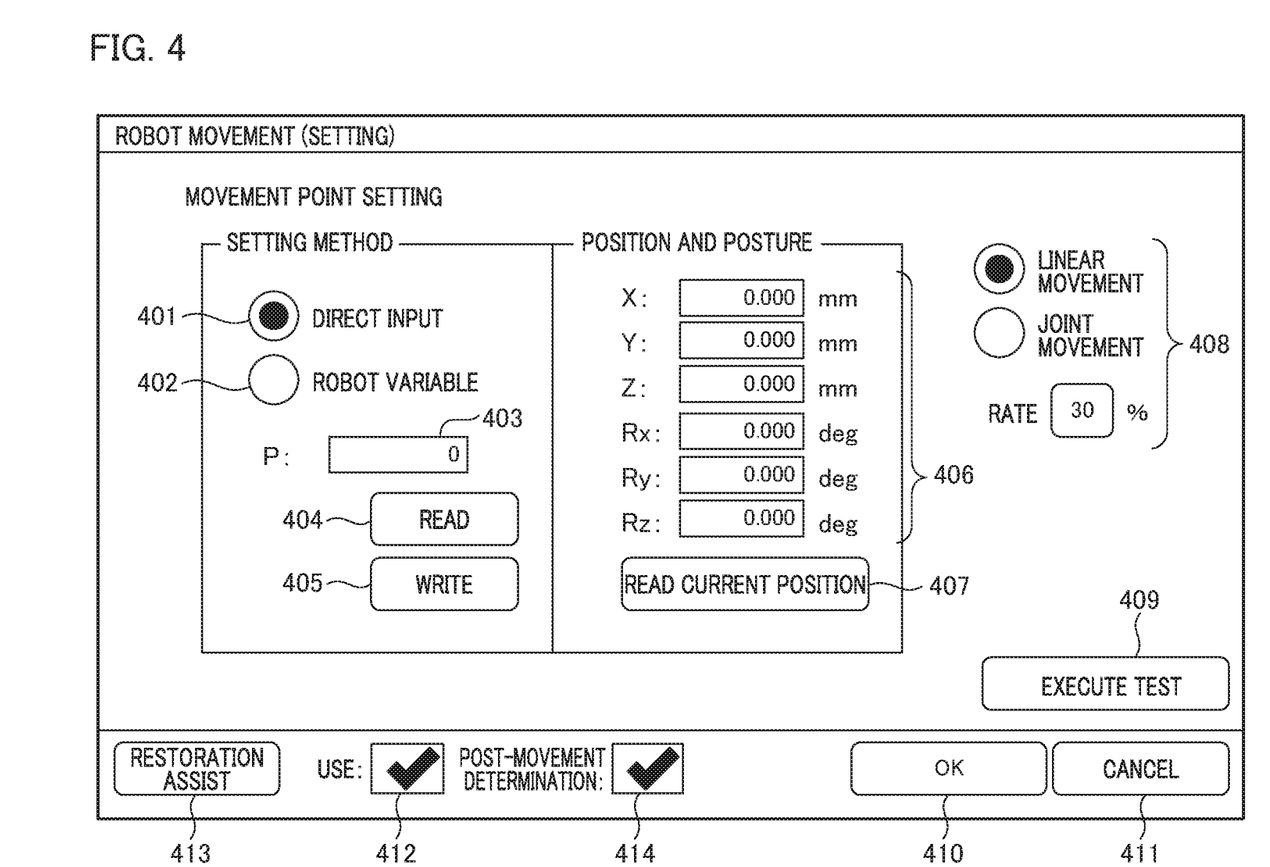
FIG. 4 is a diagram representing a setting process screen for robot movement according to the embodiment.

A user combines desired processing parts, and creates the flow chart 303 used as an object. In the created flow chart 303, if a double-click operation of any of the processing parts is performed, the flow transitions to a display process of a setting screen for setting a detailed process of the part. If a click operation of an OK button 317 is performed, the image processing device 103 generates the image processing program 207 for executing a process described in the flow chart 303. FIG. 4 is a diagram illustrating a setting screen example. This screen is displayed on the screen of the input and output display device 201 when a user designates any of the processing parts 304, 318, 310, 313, and 315 through a double-click operation, and the user can perform a setting operation relating to robot movement.

A method of setting the movement point or posture of the robot 102 is illustrated within the frame of a movement point setting method on the left side of the screen in FIG. 4. A user can select either of direct input 401 and robot variable 402 using a radio button. If a user selects the robot variable 402, a movement destination can be set by designating a teaching point (point P) stored by the robot or its control device in an input box 403. A read button 404 is an operation button for reading a teaching point stored by the robot or its control device. In addition, a write button 405 is an operation button for storing the current position and posture of the robot as a teaching point of the robot or its control device.

If a user selects the direct input 401, the position and posture of the robot can be edited by a numerical value in an editing area 406 in the middle of the screen. An operation button 407 is a reading button of the current position, a user has a tendency to perform editing by data of the position and posture of the robot at this point of time being read through an operation of the operation button 407.

A region 408 on the right side of the screen in FIG. 4 shows a method of selecting a move mode for a movement destination of the robot or a setting section of movement speed. An operation button 409 located below the region is a test execution button for confirming operations set by various widgets (401 to 408). An OK button 410 located further below is a button for storing set value data. If a user operates the OK button 410, various types of set value data are saved in the processing data save area 206 of the image processing device 103 in association with the image processing program 207 or the like. The set value data is used by being read out from the processing data save area 206 during program execution. If a user operates a cancel button 411, these set values are discarded.

Operating sections (see 412 to 414) used when a user uses a function relating to work restoration assistance are provided on the lower left of FIG. 4. The operation button 413 is a call button of a screen of a work restoration assistance function. If a user operates the call button, a screen to be described later (FIG. 6: a work restoration assistance screen 601) is displayed.

When a user uses a work restoration assistance function, the movement point of the robot 102 is set, and then imaging performed by the imaging device 104 is performed. Captured image data is saved as data of a corresponding image associated with the set values (see 401 to 408) of a movement destination. The details thereof will be described later with reference to FIG. 5. In addition, a process of storing imaging parameters used by the imaging device 104 is executed. The imaging parameters are, for example, a zoom value, panning, a value of tilting and the like in accordance with a mechanism included in the imaging device 104 in addition to an aperture value, a gain, ISO sensitivity, an exposure time, a white balance, a focal length and the like. If the imaging device 104 has a manual or automatic imaging parameter adjustment function, the adjustment screens are presented to a user.

A check box 412 is used in the determination of save of the set values (see 401 to 408) of a movement destination, imaging parameters, or the like, and a determination process of function use (use with a check mark) is performed depending on the presence or absence of a check mark. In addition, a portion of the work restoration assistance function may be executed at a timing during robot movement in the image processing program, and a post-movement determination function of confirming a layout at any time may be provided. In that case, a check box 414 for a user to designate use of the post-movement determination function is used (use with a check mark).

Figure 5:
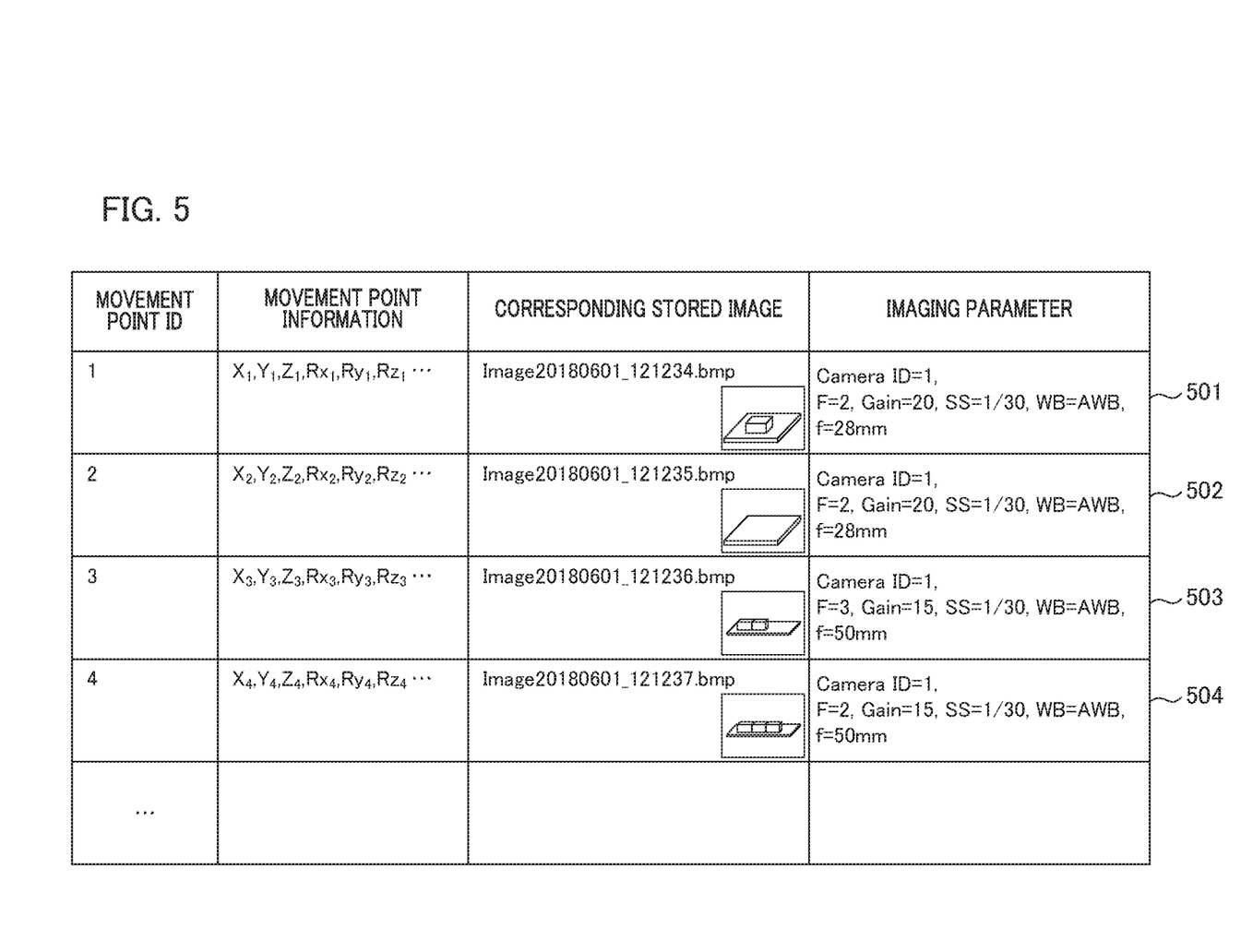
FIG. 5 is a diagram representing a method of associating a movement point with a corresponding stored image.

FIG. 5 shows a data example in a case where imaging is automatically performed by the imaging device 104 in association with a teaching point when a user operates the OK button 410 of FIG. 4. Pieces of data 501 to 504 shown in respective rows are a movement point ID (identification information), movement point information, information of a corresponding stored image, and information of imaging parameters. The movement point information is information of various set values of the movement point set in FIG. 4, and the corresponding stored image is information of a stored image captured when the movement point is saved. These pieces of information are associated with an imaging parameter group. A movement point ID, a set value, and data of a corresponding stored image are saved corresponding to the processing part of the robot movement (see the robot movement of FIG. 3). Meanwhile, if the cancel button 411 of FIG. 4 is operated, the set value is discarded.

Figure 6:
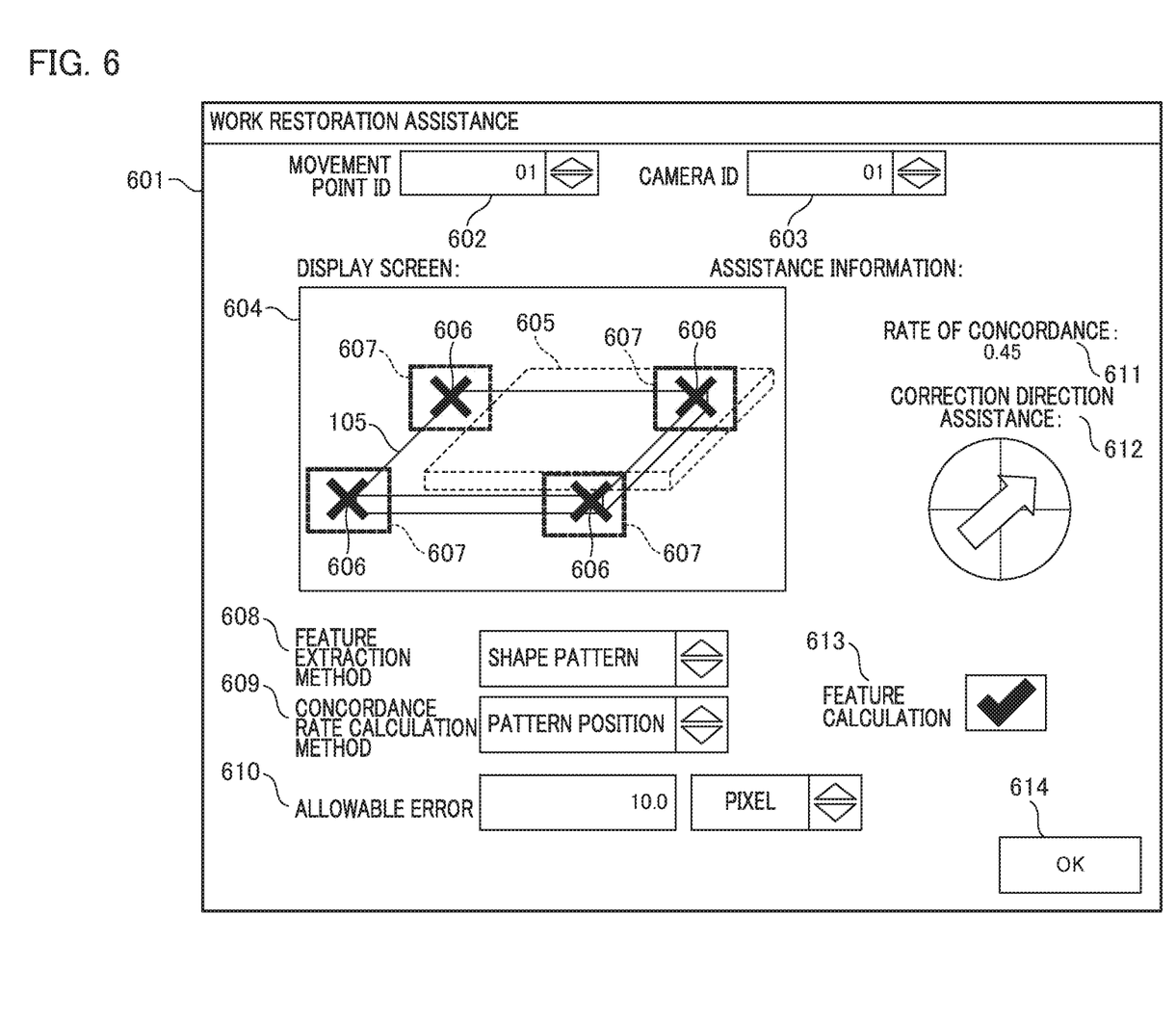
FIG. 6 is a diagram representing a screen of a work restoration assistance function.
Figure 7:
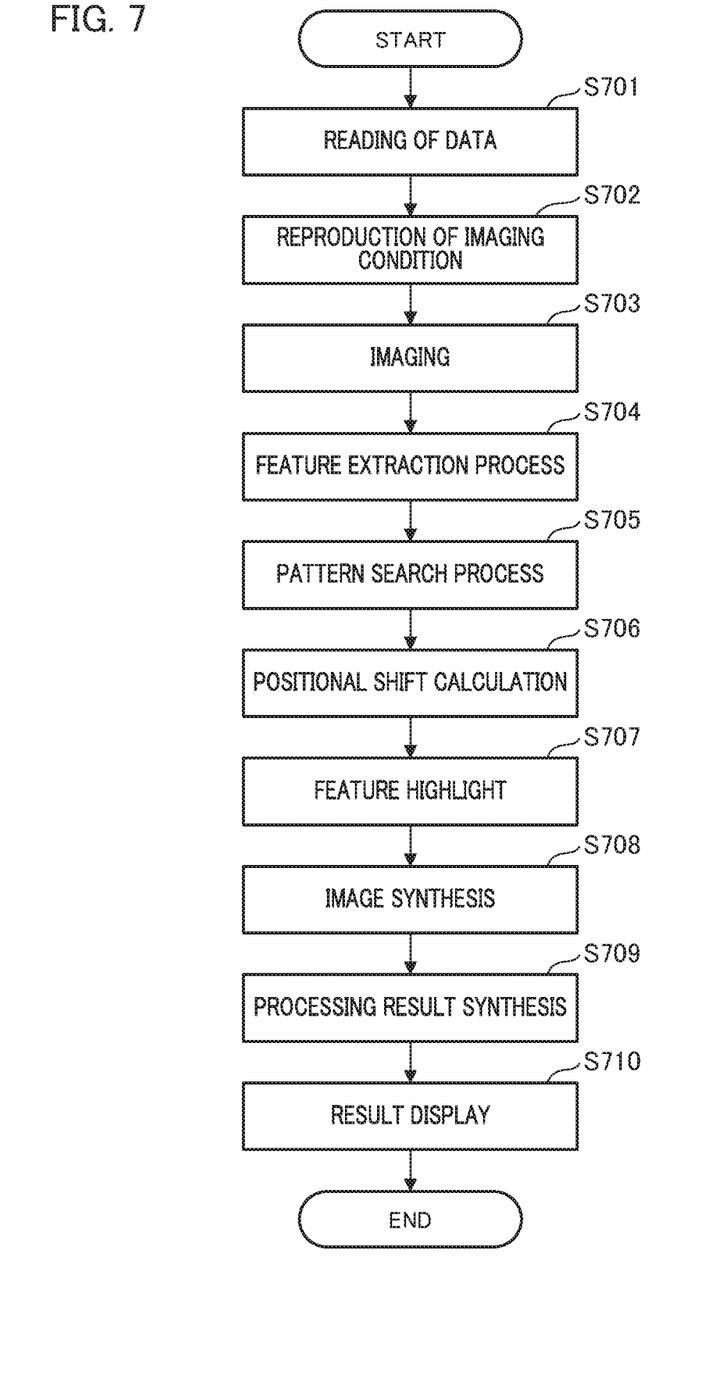
FIG. 7 is a flow chart illustrating a process of the work restoration assistance function.

The work restoration assistance function will be described in detail with reference to FIGS. 6 and 7. FIG. 6 shows a screen example for the work restoration assistance function. In a robot system including the image processing device 103, screen display for assisting restoration of a positional shift, a layout or the like is performed. FIG. 7 is a flow chart illustrating a process of the work restoration assistance function.

A screen 601 shown in FIG. 6 is displayed on the input and output display device 201 by a program being executed, for example, when the operation button 413 for work restoration assistance shown in FIG. 4 or the like is operated. A selection section 602 is a box with a spin control used when a user selects a movement point ID set by the processing part of the robot movement. If a plurality of movement points are present, a user can designate a desired movement point. There is a method based on semi-automatic or automatic setting in addition to a method of selecting a movement point by a user's designation. For example, a process of performing a continuous motion operation of a system or the like, or determining the shape of a feature or the like after a feature extraction process, and estimating a movement point having a stable feature is performed. A process of presenting and recommending an estimation result of a movement point to a user or an automatic setting process based on the estimation result is executed.

A selection section 603 is a box with a spin control used when a user selects a camera ID. If a system includes a plurality of cameras as imaging devices, a user can designate a desired camera through the selection section 603. There is a method based on a semi-automatic or automatic setting in addition to a method of selecting a camera ID by a user's designation. For example, a process of performing a continuous motion operation of a system or the like, or using the shape or distribution of a feature, shade information, or the like after the feature extraction process, and estimating an imaging device (a specific camera) having a stable feature is performed. A process of presenting and recommending an estimation result to a user or an automatic setting process based on the estimation result is executed.

An image display region 604 is a display region for assisting work restoration. Since a stored image 605 associated a movement point is displayed in the image display region 604 in a state of being superimposed on the current captured image, a user can easily ascertain a difference between the displayed images. In FIG. 6, in the current movement point ID "01," a situation in which an image including the workbench 105 is displayed is illustrated. Feature information 606 extracted on the basis of image processing is displayed together with an image.

A process of generating a display screen including the image display region 604 will be described with reference to FIG. 7. The process of FIG. 7 is realized by the CPU of the arithmetic operation unit 204 of the image processing device 103 executing a predetermined program. In S701, a process of reading stored data is performed. Stored data corresponding to a movement point ID designated by the operation of the selection section 602 of FIG. 6 (FIG. 5: any of 501 to 504) is acquired.

In S702, a process of reproducing imaging conditions is performed. The imaging conditions are reproduced by the movement of a designated robot to a movement point or a setting of imaging parameters on the basis of the data acquired in S701. In S703, imaging is performed using the imaging device 104, and in subsequent S704, the feature extraction process is executed. In S704, the feature extraction process is performed in a predetermined region with respect to an image corresponding to the acquired stored data. A selection section 608 of FIG. 6 is a box with a spin control that makes it possible to set an image processing method of performing feature extraction. Examples of selection items in the image processing method of feature extraction include pattern matching, edge detection, shade detection, a binarized centroid, a circumscribed rectangle, a circumferential length, a color, and the like. A method in which a feature can be calculated in an image processing function can be selected freely.

In FIG. 6, a plurality of predetermined regions 607 are shown within the frame of the image display region 604. The region 607 is a region equivalent to a target range of image processing in which feature extraction is performed, and a process of using an extracted feature as a search pattern is performed in S704 of FIG. 7. The region 607 is a region having a feature amount of the captured image larger than a threshold, and a recommended range is automatically set from the intensity gradient, shape or the like of an edge by performing the feature extraction process such as, for example, edge enhancement. Alternatively, it is possible to correct the region 607 by accepting an instruction under a user's manual operation, or to perform a region setting arbitrarily.

In S705 of FIG. 7, a pattern search process based on the search pattern of S704 is performed on the image captured in S703. In S706, positional shift calculation is performed on the basis of a pattern search result of S705, the rate of concordance or the degree of similarity between patterns and the amount of positional shift are calculated. The selection of a calculation method will be described later.

In S707, a feature emphasis process is performed in order to improve visibility. For example, the feature information 606 is highlighted by a mark × within the frame of the image display region 604 in FIG. 6. In S708, an image synthesis process is executed, and a synthesized image of a corresponding stored image of the selected movement point and the image captured in S703 is generated. In S709, a process of synthesizing results of a visual assistance process is further executed. The visual assistance process is a process in order for a user to easily recognize position, posture or the like as shown in S707. In S710, a synthesized processing result is displayed in the image display region 604 of FIG. 6. A final image in which the corresponding stored image of the selected movement point and the captured image are synthesized and an image obtained by highlighting a feature extraction result is further synthesized is presented to a user.

In the present embodiment, a method of displaying the captured image acquired during work restoration and the image (corresponding stored image) captured when a movement point that is a teaching point is set in a superimposed manner has been described. Without being limited thereto, each image may be displayed on a separate screen, the images may be displayed side by side, or the like.

A selection section 609 of FIG. 6 is a box with a spin control that makes it possible to select a method of calculating the rate of concordance or the degree of similarity between a feature of a corresponding stored image captured in advance and a feature extracted from the current captured image during work restoration assistance. Example of the extracted feature include the position or phase of a pattern, an edge, a shade value, the area or position of a binarization region, the size, position, inclination, length, or color density value of a rectangle, and the like. Regarding each feature, a positional relationship between a plurality of features such as the degree of concordance between patterns, a difference between barycentric positions of edges or regions, the size of a rectangle, a distance between position coordinates, a difference between inclinations, a difference between lengths, or a difference between shades, and the like can be selected. Meanwhile, a combination of two or more calculation methods may be set.

In addition, the accuracy of work restoration required may vary depending on a system operation or a process. Consequently, in the present embodiment, a designation section 610 of an allowable error (FIG. 6) is provided. The designation section 610 is a box with a spin control used when a user designates an allowable error in a movement point ID. The allowable error indicates how much an error influenced by reproducibility during image measurement is allowed, and is represented by the number of pixels or an actual distance (for example, millimeter unit). In the present embodiment, an embodiment in which a user directly designates the allowable error in the designation section 610 on the basis of a measurement error amount required for a system operation is assumed. As another embodiment, there is a method of estimating an error amount capable of being taken by image measurement from a measurement error range required for a process, a positional relationship between a robot posture and a workpiece, device information of an imaging device used in a system, or the like, calculating a recommendation value using a difference, and presenting the calculated value to a user.

The present embodiment has a function of displaying a rate of restoration on the basis of the result of positional shift calculation obtained in S706 of FIG. 7. Since a rate of concordance 611 is displayed as a rate of restoration in a display field of assistance information of FIG. 6, a user can perform restoration work so that the rate of concordance is improved while confirming its numerical value. In addition, a navigation display of correction direction assistance 612 (FIG. 6) is a display for recommending a movement direction (correction direction) for improving the rate of concordance 611 using information of the positional shift calculation result. A user can ascertain a correction direction from an indicator such as an arrow.

A check box 613 of FIG. 6 is used in the case of selection of whether to use user assistance using image processing such as feature extraction (see 608 to 610) (use with a check mark). An operation button 614 is used when the work restoration assistance function is ended. When the screen of FIG. 6 is closed, a process of storing various types of information (see 602 to 613) together with the current time or the like in a memory is performed in order to store what restoration is finally performed. In addition, if an operator of a system or the like can be detected, an operator ID or the like may also be stored to be included in the information.

In the above description, it is assumed that the screen display of work restoration assistance of FIG. 6 and the process shown in FIG. 7 are executed upon the event of the operation button 413 of FIG. 4 being pressed, but in the following, a case where a restoration assistance process is performed immediately after robot movement during actual work will be described. The robot movement during actual work is, for example, robot movement shown in the processing parts (304, 318, 310, 313, and 315) of FIG. 3.

A process in a case where the check box 414 of FIG. 4 is checked and the post-movement determination function is used will be described with reference to the flow chart of FIG. 8. Since processes of S801 to S806 and S809 to S812 are the same as processes of S701 to 706 and S707 to S710 in FIG. 7, the detailed description thereof will not be given, and a difference therebetween will be described.

The processes of S801 to S806 are executed immediately after the movement of the robot 102, and the amount of positional shift is determined in S807. That is, a determination process is executed with respect to whether the amount of positional shift falls within an allowable error amount designated by the designation section 610 of an allowable error (FIG. 6). If it is determined that the amount of positional shift falls within the allowable error amount, the work restoration assistance process is ended, and the flows proceeds to the next process of the image processing program 207. In addition, if it is determined that the amount of positional shift falls outside the allowable error amount, the flow proceeds to S808, the image processing program 207 that is being executed is stopped, and a display process of the screen 601 is performed. The processes of S809 to S812 are executed subsequently to S808.

Figure 8:
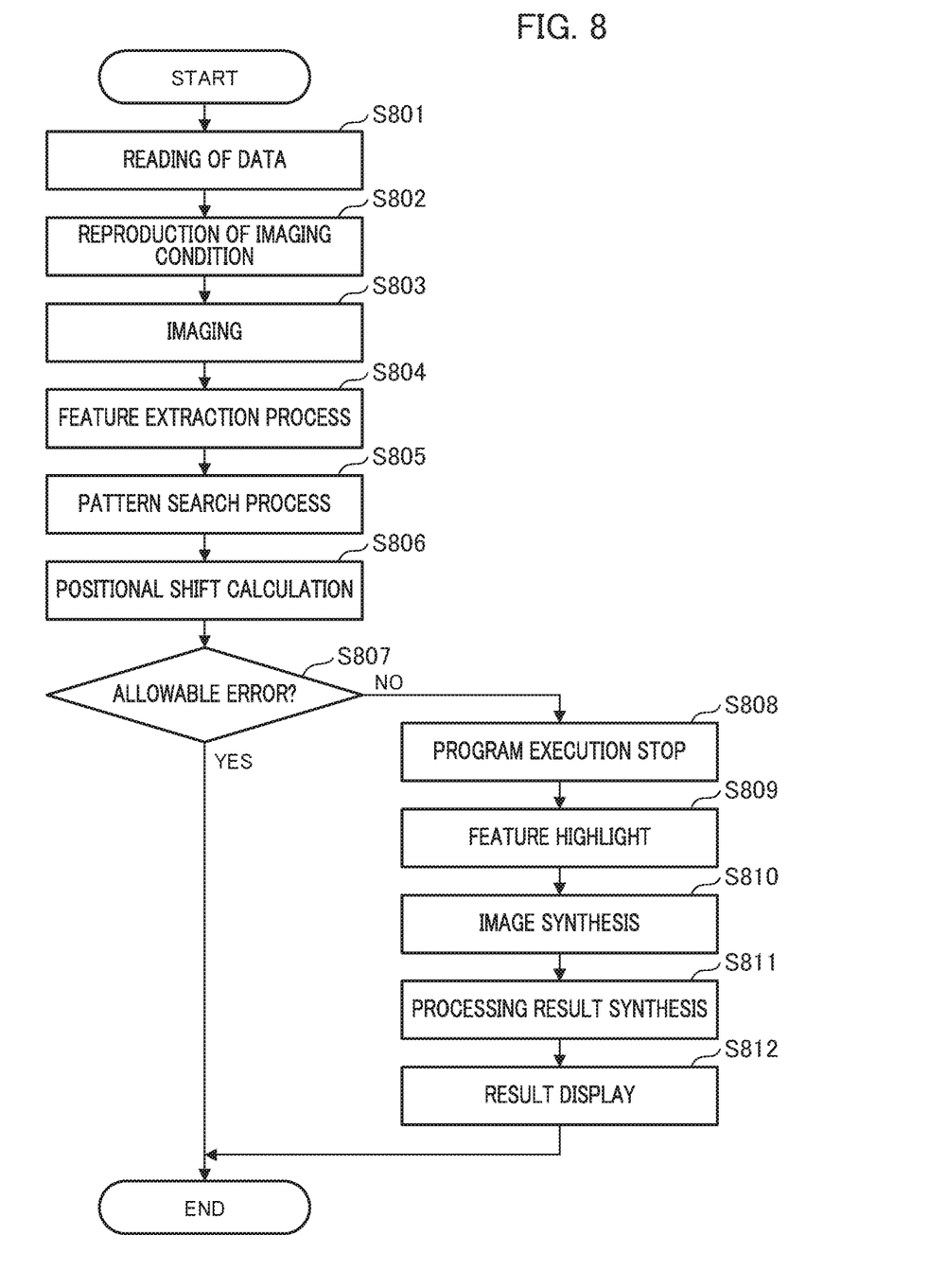
FIG. 8 is a flow chart illustrating a confirmation process in which the work restoration assistance function is used.

In FIG. 8, on each robot movement, S801 (reading of data), S802 (reproduction of imaging conditions), S803 (imaging), or the like is performed. Without being limited thereto, a method of achieving communalization with a process during actual work by holding required data on a RAM in a case where a process is executed once or more in the image processing program or a reading process or the like is performed beforehand may be used.

In the process shown in FIG. 8, even while the image processing program 207 is being executed, it is possible to determine whether a positional shift of a work layout occurs. If a positional shift exceeding a threshold occurs, it is possible to stop the following operation of a system. Thereby, it is possible to reduce the number of failures of work, and to rapidly assist with layout restoration after that.

In addition, a feature extraction result in S804 or data of the amount of positional shift in S806 may be monitored and stored for each image processing, and a graphical representation process such as display of a graph may be performed. In this case, for example, linear approximation or polynomial approximation of data for a specific period of time is performed so that a user can observe a change over time, and a process that makes it possible to confirm that the inclination of a graph falls within a predetermined threshold range is performed. In addition, if it is determined that the change over time is a change having a predetermined tendency, it is possible to assist with the maintenance of a system by performing a notification to a user, warning display, or the like.

In the present embodiment, if a physical positional shift of a layout occurs in a system relating to various types of work, and work becomes difficult to perform, a stored image associated with a teaching position (work point) when work is restored and current image information are displayed together. Thereby, it is possible to assist with the restoration of work for the physical positional shift of a layout. Further, since pieces of feature information of the stored image and the current captured image are compared with each other during work restoration, and the rate of restoration (such as the rate of concordance or the degree of similarity) can be displayed as a numerical value, a user can easily understand the situation of restoration of a layout. In addition, if the pieces of feature information of the stored image and the current captured image are compared with each other, and information in which a rate of concordance therebetween is able to be improved (correction information) can be found, the information can be output, thereby allowing a user to easily understand a method of restoring a layout and to perform restoration work.

In the present embodiment, since it is possible to compare pieces of feature information of images during work in a time-series manner, to estimate stable feature information using a shape or an intensity gradient, and to recommend the extraction range of a feature, there is an advantage of a user being able to perform a setting efficiently. In addition, it is possible to suppress trouble of work by appropriately confirming the feature extraction result or the amount of positional shift during the execution of the image processing program, and stopping a system operation in the case of exceeding the designated allowable error amount. In addition, outputting a processing result by performing the graphical representation or trend analysis of the amount of positional shift or the like is helpful to the maintenance of a system.

As described above, in the image processing device, the teaching point of a device for work and the captured image are stored in association with each other, an image or the like associated with the operation of the device for work corresponding to the teaching point is displayed when work or restoration of a layout is performed, and the assistance process of work restoration is performed. According to the present embodiment, a user can terminate correction for restoring work in a shorter time.

Hereinbefore, although the present invention has been described on the basis of its preferred embodiments, the present invention is not limited to these specific embodiments, and various embodiments without departing from the spirit or scope of the present invention are also included in the technical scope of the present invention. Some of the above-described embodiments may be appropriately combined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MD), or Blu-ray Disc (BD)™), a flash memory device, a memory card, and the like.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-220364, filed Nov. 26, 2018, which is hereby incorporated by reference wherein in its entirety.

What is claimed is:

1. An image processing device comprising:
   at least one processor and memory holding a program which makes the processor function as:
   a control unit configured to control an operation of a device for work using a teaching point representing a position or posture of the device for work;
   a storage unit configured to store image data at the teaching point captured by an imaging sensor and data of the position or posture of the device for work corresponding to the teaching point in association with each other; and
   an image processing unit configured to perform an assistance process of assisting with setting of work restoration by processing data of a first image captured by the imaging sensor at the teaching point of the device for work when work restoration is performed and data of a second image at the teaching point which is read out from the storage unit, and displaying the first and second images,
   wherein the image processing unit performs control for displaying a setting screen having an image display region in the assistance process and displaying the first and second images in a superimposed manner in the image display region.

2. The image processing device according to claim 1, wherein the image processing unit performs the assistance process by extracting features of the first and second images, calculating an amount of shift between positions or postures of the feature of the first image and the feature of the second image, and displaying a rate of restoration of work restoration.

3. The image processing device according to claim 2, wherein the image processing unit performs the assistance process by displaying a rate of concordance or a degree of similarity between the feature of the first image and the feature of the second image as the rate of restoration.

4. The image processing device according to claim 2, wherein the image processing unit performs the assistance process by obtaining and displaying a correction direction for improving the rate of restoration using the amount of shift.

5. The image processing device according to claim 1, wherein the image processing unit performs control for displaying feature information of the first image extracted through image processing in the image display region together with the first and second images.

6. The image processing device according to claim 1, wherein the image processing unit performs control for comparing feature information of a captured image during work of the device for work in a time-series manner to estimate the feature information, and displaying an extraction range of the feature information in the image display region.

7. The image processing device according to claim 1, wherein the image processing unit performs a process of displaying a region having a feature amount of the first image larger than a threshold in the image display region, and accepting adjustment of work restoration or a change of setting.

8. The image processing device according to claim 2, wherein, while an image processing program is being executed during work of the device for work, the image processing unit performs a process of stopping execution of the image processing program in a case where the amount of shift falls outside a designated error amount.

9. The image processing device according to claim 8, wherein the image processing unit outputs a processing result of graphical representation or trend analysis by repeatedly executing the image processing program and monitoring a feature extraction result of the first image or a change of the amount of shift.

10. A method of controlling an image processing device, comprising:
    controlling an operation of a working device using a teaching point representing a position or posture of the working device;
    performing control for capturing an image of a subject at the teaching point using an imaging sensor;
    storing image data at the teaching point captured by the imaging sensor and data of the position or posture of the working device corresponding to the teaching point in association with each other in a storage; and
    performing a process of assisting with setting of work restoration by processing data of a first image captured by the imaging sensor at the teaching point of the working device when work restoration is performed and data of a second image at the teaching point which is read out from the storage, and displaying the first and second images,
    wherein the performing performs control for displaying a setting screen having an image display region in the assistance process and displaying the first and second images in a superimposed manner in the image display region.

11. A non-transitory recording medium storing a control program of an image processing device causing a computer to perform each step of a control method of the image processing device, the method comprising:
    controlling an operation of a device for work using a teaching point representing a position or posture of the device for work;
    performing control for capturing an image of a subject at the teaching point using an imaging sensor;
    storing image data at the teaching point captured by the imaging sensor and data of the position or posture of the device for work corresponding to the teaching point in association with each other in a storage unit; and performing a process of assisting with setting of work restoration by processing data of a first image captured by the imaging sensor at the teaching point of the device for work when work restoration is performed and data of a second image at the teaching point which is read out from the storage unit, and displaying the first and second images, wherein the performing performs control for displaying a setting screen having an image display region in the assistance process and displaying the first and second images in a superimposed manner in the image display region.

* * * * *